US011875922B2

(12) United States Patent
Kibe et al.

(10) Patent No.: US 11,875,922 B2
(45) Date of Patent: *Jan. 16, 2024

(54) INSULATED ELECTRIC WIRE

(71) Applicant: Hitachi Metals, Ltd., Tokyo (JP)

(72) Inventors: Tamotsu Kibe, Tokyo (JP); Motoharu Kajiyama, Tokyo (JP); Masafumi Kaga, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 1060 days.

This patent is subject to a terminal disclaimer.

(21) Appl. No.: 16/146,703

(22) Filed: Sep. 28, 2018

(65) Prior Publication Data

US 2019/0139676 A1 May 9, 2019

(30) Foreign Application Priority Data

Nov. 7, 2017 (JP) .................................. 2017-214344

(51) Int. Cl.
*H01B 7/295* (2006.01)
*H01B 3/44* (2006.01)
(Continued)

(52) U.S. Cl.
CPC ............... *H01B 7/295* (2013.01); *B32B 1/00* (2013.01); *B32B 15/085* (2013.01); *B32B 15/20* (2013.01);
(Continued)

(58) Field of Classification Search
CPC ...... H01B 7/295; H01B 7/0275; H01B 3/441; H01B 7/0216; H01B 7/0225; B32B 1/00;
(Continued)

(56) References Cited

U.S. PATENT DOCUMENTS 5,716,574 A * 2/1998 Kawasaki ................ B29B 7/90
425/97
5,912,436 A 6/1999 Sanchez et al.
(Continued)

FOREIGN PATENT DOCUMENTS

CN 106409393 A 2/2017
CN 107527690 A 12/2017
(Continued)

OTHER PUBLICATIONS

Machine translation of JP2015-118857A, published Jun. 2015. (Year: 2015).*
(Continued)

*Primary Examiner* — Monique R Jackson
(74) *Attorney, Agent, or Firm* — MCGINN I.P. LAW GROUP, PLLC.

(57) ABSTRACT

An insulated electric wire is composed of a conductor, and a covering layer disposed around an outer circumference of the conductor. The covering layer has a plurality of flame retardant layers composed of a flame retardant resin composition, and an insulating layer interposed between the plurality of flame retardant layers. The insulating layer is made of a resin composition including a resin component, and the resin component includes 40% by mass or more of a resin having a melting point of 125 degrees C. or higher of 100% by mass of the resin component.

17 Claims, 3 Drawing Sheets

(51) Int. Cl.
- *B32B 1/00* (2006.01)
- *B32B 15/085* (2006.01)
- *H01B 7/02* (2006.01)
- *H01B 1/02* (2006.01)
- *B32B 15/20* (2006.01)

(52) U.S. Cl.
CPC ............. *H01B 1/026* (2013.01); *H01B 3/441* (2013.01); *H01B 7/02* (2013.01); *H01B 7/0225* (2013.01); *B32B 2307/3065* (2013.01); *B32B 2457/00* (2013.01)

(58) Field of Classification Search
CPC ................. B32B 15/085; B32B 15/20; B32B 2307/3065; B32B 2457/00
See application file for complete search history.

(56) References Cited

U.S. PATENT DOCUMENTS

| | | | |
|---|---|---|---|
| 9,443,645 B2 | 9/2016 | Iwasaki et al. | |
| 10,755,834 B2* | 8/2020 | Kaga | H01B 3/447 |
| 10,784,018 B2* | 9/2020 | Kaga | H01B 3/441 |
| 2010/0116548 A1* | 5/2010 | Nonaka | H01B 7/295 |
| | | | 174/72 A |
| 2014/0011028 A1 | 1/2014 | Iwasaki et al. | |
| 2014/0370315 A1* | 12/2014 | Iwasaki | C08K 3/22 |
| | | | 428/516 |
| 2017/0032867 A1 | 2/2017 | Iwasaki et al. | |
| 2017/0365373 A1 | 12/2017 | Hirano et al. | |

FOREIGN PATENT DOCUMENTS

| | | |
|---|---|---|
| EP | 3 264 425 A1 | 1/2018 |
| JP | H 05-047225 A | 2/1993 |
| JP | H 06-052728 A | 2/1994 |
| JP | 2011-228189 A | 11/2011 |
| JP | 2014-011140 A | 1/2014 |
| JP | 2015-118857 A | 6/2015 |
| JP | 2017-027878 A | 2/2017 |

OTHER PUBLICATIONS

Prime Polymer, HI-ZEX Product Data Sheet, Apr. 2013. (Year: 2013).*
Extended European Search Report dated Mar. 28, 2019 for European Patent Application No. 18197911.3-1105.
Japanese Office Action, dated Mar. 26, 2020, in Japanese Application No. 2019-005194 and English Translation thereof.
Japanese Office Action dated Nov. 22, 2013, in Japanese Application No. 2017-214344 and English Translation thereof.
Extended European Search Report dated Aug. 28, 2020 for European Patent Application No. 18 197 911.3-1105.
Japanese Decision of Refusal, dated Feb. 1, 2019, in Japanese Application No. 2017-214344 and English Translation thereof.
Chinese Office Action, dated Feb. 24, 2021, in Chinese Application No. 201811110080.0 and English Translation thereof.

* cited by examiner

INSULATED ELECTRIC WIRE

The present application is based on Japanese patent application No. 2017-214344 filed on Nov. 7, 2017, the entire contents of which are incorporated herein by reference.

BACKGROUND OF THE INVENTION

1. Field of the Invention

The present invention relates to an insulated electric wire.

2. Description of the Related Art

Insulated electric wires used as wiring for rolling stocks and automobiles are required to have not only insulation but also flame retardancy which is difficult to burn at the time of fire. Therefore, a flame retardant is compounded in a covering layer of the insulated electric wire. For example, JP-A-2014-11140 discloses an insulated electric wire in which a covering layer is formed by stacking a flame retardant layer including a flame retardant around an outer circumference of an insulating layer having insulating properties. According to JP-A-2014-11140, it is said that insulation properties, flame retardancy and oil resistance can be obtained at a high level in a well-balanced manner.

SUMMARY OF THE INVENTION

Now, in recent years, it has been demanded for the insulated electric wires to have a small outer diameter from the viewpoint of weight reduction. Therefore, it has been studied to reduce the thickness of the insulating layer positioned on the inner side and the flame retardant layer located on the outer side.

Therefore, an object of the present invention is to provide an insulated electric wire having an electric wire structure capable of reducing its diameter while maintaining insulation properties, flame retardancy and oil resistance.

The present invention provides the following insulated electric wires.

[1] An insulated electric wire, comprising:
a conductor; and
a covering layer disposed around an outer circumference of the conductor,
in which the covering layer comprises a plurality of flame retardant layers composed of a flame retardant resin composition, and an insulating layer interposed between the plurality of flame retardant layers,
in which the insulating layer comprises a resin composition including a resin component, and the resin component includes 40% by mass or more of a resin having a melting point of 125 degrees C. or higher of 100% by mass of the resin component.

[2] The insulated electric wire according to the aspect [1], in which the resin having a melting point of 125 degrees C. or higher is polyethylene having a density of 0.930 g/m$^3$ or more.

[3] The insulated electric wire according to the aspect [1] or [2], in which the insulated electric wire has a flame retardancy which passes the vertical tray flame test (VTFT), based on EN50266-2-4.

[4] The insulated electric wire according to any one of the aspects [1] to [3], in which the insulated electric wire has a flame retardancy which passes the vertical flame test (VFT), based on EN60332-1-2.

[5] The insulated electric wire according to any one of the aspects [1] to [4], in which the insulated electric wire has a direct current stability which passes the direct current stability test in compliance with EN50305.6.6.7.

[6] The insulated electric wire according to any one of aspects [1] to [5], in which a diameter of the conductor is 1.25 mm or less and a thickness of the covering layer is less than 0.6 mm.

[7] The insulated electric wire according to any one of aspects [1] to [6], in which the insulation layer has a volume resistivity defined by JISC2151 exceeding $5.0 \times 10^{15}$ (Ω·cm).

[8] The insulated electric wire according to any one of aspects [1] to [7], in which the flame retardant resin composition for forming the flame retardant layer includes a resin component and a flame retardant, and includes 150 parts by mass or more and 250 parts by mass or less of the flame retardant with respect to 100 parts by mass of the resin component.

[9] The insulated electric wire according to any one of aspects [1] to [8], in which the insulating layer includes a resin component and an additive, and includes 5 parts by mass or less of the additive with respect to 100 parts by mass of the resin component.

Points of the Invention

According to the present invention, it is possible to provide the insulated electric wire having an electric wire structure capable of reducing its diameter while maintaining insulation properties, flame retardancy and oil resistance.

DETAILED DESCRIPTION OF THE PREFERRED EMBODIMENTS

Figure 3:
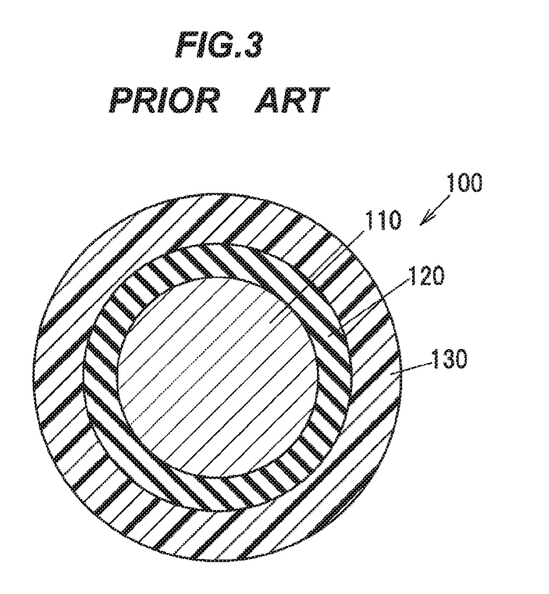
FIG. 3 is a transverse sectional view of a conventional insulated electric wire.

First, a conventional insulated electric wire will be described with reference to FIG. 3. FIG. 3 is a cross-sectional view perpendicular to a longitudinal direction of a conventional insulated electric wire. As shown in FIG. 3, the conventional insulated electric wire 100 includes a conductor 110, an insulating layer 120 disposed around the outer circumference of the conductor 110, and a flame retardant layer 130 disposed around the outer circumference of the insulating layer 120 and including a flame retardant.

In the conventional insulated electric wire 100, since the flame retardant layer 130 is formed of a resin similarly to the insulating layer 120, it exhibits a predetermined insulation property, but the reliability of insulation is low and it often does not contribute to direct current stability. As described later, the direct current stability is one of the electrical characteristics evaluated by a direct current stability test in compliance with EN 50305.6.7, and indicates that dielectric breakdown does not occur even when the insulated electric wire 100 is immersed in saline, a predetermined voltage is applied, and a predetermined time elapses, so that the direct current stability is an index of the reliability of insulation.

According to the investigation by the present inventors, it was found that the reason why the flame retardant layer 130 does not contribute to the direct current stability is that the volume resistivity is lowered by compounding the flame retardant. One factor for this is considered to be that in the flame retardant layer 130, a minute gap is formed around the flame retardant due to poor adhesion between the resin forming the flame retardant layer 130 and the flame retardant. Due to the formation of this gap, water tends to permeate into the flame retardant layer 130 and the flame retardant layer 130 tends to absorb the water. In such a flame retardant layer 130, when the direct current stability is evaluated by immersing the insulated electric wire 100 in water, a conductive path is formed by penetration of water and dielectric breakdown is likely to occur, so that the insulation reliability tends to be low. As described above, the electrical insulating property of the flame retardant layer 130 tends to be lowered due to water absorption, so that it does not contribute to the direct current stability.

On the other hand, since the insulating layer 120 is covered with the flame retardant layer 130, there is no need to compound a flame retardant. Therefore, although the insulating layer 120 does not exhibit flame retardancy unlike the flame retardant layer 130, it is configured so as to have a high volume resistivity, and contributes to the direct current stability.

As described above, in the conventional insulated electric wire 100, the insulating layer 120 contributes to the direct current stability and the flame retardant layer 130 contributes to the flame retardancy, respectively. Therefore, in turn to achieve both the direct current stability and the flame retardancy at a high level, it is necessary to increase the thicknesses of the insulating layer 120 and the flame retardant layer 130, respectively, so that it is difficult to thin each of the insulating layer 120 and the flame retardant layer 130 in order to reduce the diameter of the insulated electric wire 100.

The present inventors contemplated that since in the conventional insulated electric wire 100, the direct current stability (the reliability of insulation) is lowered by providing the flame retardant layer 130 tending to absorb water and having a low volume resistivity on the surface, if the flame retardant layer 130 is such configured that water does not permeate the flame retardant layer 130, it would be possible to make the flame retardant layer 130 contribute not only to the flame retardancy but also to the direct current stability, and finally it would be possible to reduce the thickness of the insulating layer 120 and to reduce the outer diameter of the insulated electric wire 100.

Therefore, as a result of examining a method of suppressing the penetration of water into the flame retardant layer 130, the inventors achieved to provide the insulating layer around the outer circumference of the flame retardant layer.

That is, since the penetration of water into the flame retardant layer can be suppressed by the insulating layer, the flame retardant layer can function as a resin layer having not only the flame retardancy but also the direct current stability. As a result, it is possible to omit the insulating layer 120 that was conventionally formed. That is, the conventional stacked structure including the insulating layer 120 and the flame retardant layer 130 can be made of a stacked structure consisting of an insulating layer and a flame retardant layer. Since the insulating layer has such a thickness as to prevent penetration of water and it is not necessary to form the insulating layer thick like the conventional insulating layer 120, it is possible to reduce the outer diameter of the insulated electric wire.

However, since the insulating layer includes substantially no flame retardant and is inferior in flame retardancy, if such an insulating layer is provided over the surface of the insulated electric wire, the flame retardancy as the whole insulated electric wire may be lowered.

In this respect, by making the insulating layer poor in flame retardancy exist between the flame retardant layers, e.g., by forming the covering layer of three layers including the first flame retardant layer, the insulating layer and the second flame retardant layer (hereinafter sometimes collectively referred to as "covering layer") in turn from the conductor side, it is possible to suppress water infiltration into the first flame retardant layer by the insulating layer to maintain the high direct current stability and realize the reduction of the diameter while maintaining the flame retardancy in the second flame retardant layer. The insulated electric wire that realizes the diameter reduction as described above, when it is used as a wire harness in which a plurality of such wires are bundled, has a further effect of reducing the weight of the wire harness.

In addition, the present inventors conducted intensive studies focusing on oil resistance and, as a result, have found that in an oil resistance test (e.g., EN60811-2-1), since the test was carried out under the condition of 100 degrees C., in a resin having a melting point lower than that, the crystalline portion of the resin dissolved and oil easily permeated into the resin, and the oil resistance remarkably decreased. Therefore, the present inventors have found that the oil resistance is greatly improved by using a resin having a melting point higher than the test temperature by 25 degrees C. or higher, and realized the insulated electric wire excellent in oil resistance by the resin component of the resin composition forming the insulating layer including 40% by mass or more of a resin having a melting point of 125 degrees C. or higher, of 100% by mass of the resin component.

In addition, by forming the first flame retardant layer and the second flame retardant layer so that the oxygen index which is an indication of flame retardancy exceeds 45, the first flame retardant layer and the second flame retardant layer can be made thinner and the even higher flame retardancy can be maintained in the covering layer.

Incidentally, herein, the term "diameter reduction" means making the outer diameter of the insulated electric wire smaller by making the thickness of the covering layer of the insulated electric wire smaller as compared with the conventional insulated electric wire of the same conductor diameter (Table 1—General data—Cable type 0, 6/1 kV unsheathed of EN50264-3 (2008)). Specifically, when the conductor diameter is 1.25 mm or less, the thickness of the covering layer of the insulated electric wire is less than 0.60 mm The present invention has been made based on the above findings.

<Construction of Insulated Electric Wire>

Figure 1:
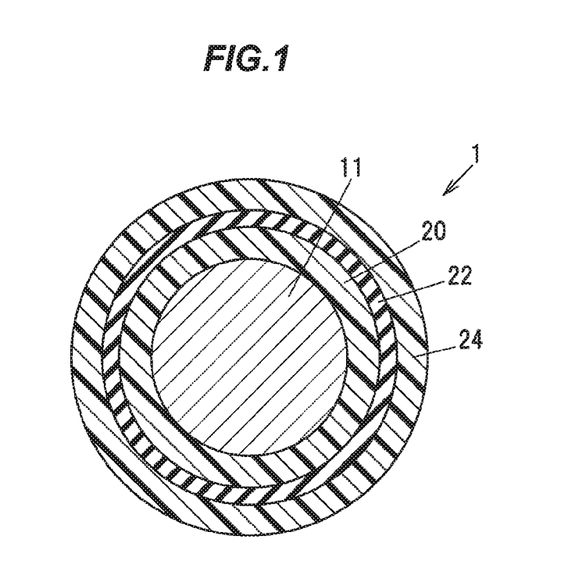
FIG. 1 is a transverse sectional view of an insulated electric wire in an embodiment according to the present invention.

Hereinafter, an insulated electric wire according to an embodiment of the present invention will be described with reference to the drawings. FIG. 1 is a sectional view perpendicular to a longitudinal direction of an insulated electric wire according to one embodiment of the present invention. As shown in FIG. 1, an insulated electric wire 1 according to this embodiment includes a conductor 11, a first flame retardant layer 20, an insulating layer 22, and a second flame retardant layer 24.

In the present embodiment, the insulating layer 22 is disposed around the outer circumference of the first flame retardant layer 20, and the second flame retardant layer 24 is disposed around the outer circumference of the insulating layer. That is, the covering layer is formed by stacking three layers of the first flame retardant layer 20, the insulating layer 22 and the second flame retardant layer 24 in turn from the conductor 11 side.

(Conductor)

As the conductor 11, it is possible to use a metal wire typically used, e.g., a copper wire, a copper alloy wire, an aluminum wire, a gold wire, a silver wire, or the like. Further, a metal wire plated with tin or nickel around an outer circumference of the metal wire may be used. Further, it is possible to use an aggregated stranded conductor (a bunch stranded conductor) obtained by stranding metal wires. The cross-sectional area and the outer diameter of the conductor 11 can be appropriately changed according to the electrical characteristics required for the insulated electric wire 1, and e.g., the sectional area may be 1 mm$^2$ or more and 10 mm$^2$ or less, and the outer diameter may be 1.20 mm or more and 2.30 mm or less.

(First Flame Retardant Layer)

The first flame retardant layer 20 is formed by, e.g., extruding a flame retardant resin composition around the outer circumference of the conductor 11, and is preferably configured so that the oxygen index exceeds 45. In the present embodiment, the first flame retardant layer 20 is formed so that the oxygen index exceeds 45, and contributes to the flame retardancy of the covering layer. In addition, since the first flame retardant layer 20 is covered with the insulating layer 22 so that the penetration of water is suppressed when the insulated electric wire 1 is immersed in water to evaluate the direct current stability, the insulation reliability is high and also contributes to the direct current stability of the covering layer. That is, the first flame retardant layer 20 contributes not only to the flame retardancy but also the direct current stability, and functions as a flame retardant insulating layer.

The oxygen index of the first flame retardant layer 20 is not particularly limited, but it is preferably more than 45 from the viewpoint of flame retardancy. Incidentally, the oxygen index is an indication of flame retardancy, and in the present embodiment, it is defined by JIS K 7201-2.

The flame retardant resin composition for forming the first flame retardant layer 20 includes a resin component and, if necessary, a flame retardant. The flame retardant resin composition is preferably a non-halogen flame retardant resin composition.

As the resin component for forming the first flame retardant layer 20, it is preferable to appropriately change the type depending on the characteristics required for the insulated electric wire 1, e.g., elongation and strength. For example, polyolefin, polyimide, polyetheretherketone (PEEK), polyamideimide (PAI) or the like can be used. When a polymer with high flame retardancy is used, addition of the flame retardant is optional, but when polyolefin is used, it is preferable to add a large amount of flame retardant so as to increase the oxygen index of the first flame retardant layer 20, and in the case of using polyimide or PEEK, since these resins have high flame retardancy of the resin component itself, it is not necessary to compound the flame retardant. Polyolefin not only has a lower molding temperature than polyimide and the like and is excellent in the moldability of the first flame retardant layer 20, but also has a large elongation at break and is excellent in the bendability of the first flame retardant layer 20.

As the polyolefin, a polyethylene based resin, a polypropylene based resin or the like can be used, and a polyethylene based resin is particularly preferable. Examples of the polyethylene based resin include linear low density polyethylene (LLDPE), low density polyethylene (LDPE), high density polyethylene (HDPE), an ethylene-α olefin copolymer, an ethylene vinyl acetate copolymer (EVA), an ethylene-ethyl acrylate copolymer, an ethylene-methyl acrylate copolymer, an ethylene-glycidyl methacrylate copolymer, an ethylene-acrylic acid ester copolymer, an ethylene-propylene-diene copolymer, or the like can be used. One kind of these resins may be used alone, or two or more kinds of them may be used in combination. From the viewpoint of obtaining higher flame retardancy in the first flame retardant layer 20, EVA is particularly preferable among polyolefin based resins. Especially EVA having a vinyl acetate content (VA content) of 10% or more and 40% or less is more preferable.

As the flame retardant, a non-halogen flame retardant is preferable because no toxic gas is generated, and e.g., a metal hydroxide can be used. The metal hydroxide decomposes and dehydrates when the first flame retardant layer 20 is heated and burned, and the released moisture lowers the temperature of the first flame retardant layer 20, thereby suppressing the burning thereof. As the metal hydroxide, e.g., magnesium hydroxide, aluminum hydroxide, calcium hydroxide, and a metal hydroxide in which nickel is solid-solved can be used. One kind of these flame retardants may be used alone, or two or more kinds of them may be used in combination.

From the viewpoint of controlling the mechanical properties (balance between tensile strength and elongation) of the first flame retardant layer 20, the flame retardant is preferably surface treated with a silane coupling agent, a titanate based coupling agent, a fatty acid such as stearic acid, a fatty acid salt such as stearate, a fatty acid metal such as calcium stearate, or the like.

From the viewpoint of ensuring that the oxygen index of the first flame retardant layer 20 exceeds 45, the compounding amount of the flame retardant is preferably 150 parts by mass or more and 250 parts by mass or less with respect to 100 parts by mass of the resin component. If the compounding amount is less than 150 parts by mass, no desired high flame retardancy may be obtained in the insulated electric wire 1. When the compounding amount exceeds 250 parts by mass, there is a possibility that the mechanical properties of the first flame retardant layer 20 deteriorate and the elongation decreases.

It is also possible to add to the polymer constituting the first flame retardant layer 20 an additive such as another flame retardant, a flame retardant aid, a crosslinking agent, a filler, a crosslinking aid, a plasticizer, a metal chelating agent, a softening agent, a reinforcing agent, a surfactant, a stabilizer, a UV absorber, a light stabilizer, a lubricant, an antioxidant, a colorant (such as carbon black), a processability improver, an inorganic filler, a compatibilizer, a blowing agent, an antistatic agent, or the like.

The thickness of the first flame retardant layer 20 is not particularly limited but may be, e.g., 0.03 mm or more and 0.3 mm or less.

Incidentally, the first flame retardant layer 20 may be crosslinked, e.g. crosslinked by radiation such as an electron beam, or a crosslinking aid may be compounded in the flame retardant resin composition forming the first flame retardant layer 20, be extrusion molded and subsequently be crosslinked.

(Insulating Layer)

The insulating layer 22 is preferably made of an insulating resin composition having a volume resistivity exceeding $5.0 \times 10^{15}$ (Ω·cm), and is configured so that the water absorption amount and the water diffusion coefficient become small. Since the insulating layer 22 has high water shielding properties, and water is difficult to penetrate thereinto, the penetration of water into the first flame retardant layer 20 located inside the covering layer can be suppressed. Incidentally, the insulating layer 22 includes substantially no flame retardant and is inferior in flame retardancy, but it is covered with a second flame retardant layer 24 described later.

The material forming the insulating layer 22 is preferably a material having a volume resistivity of more than $5.0 \times 10^{15}$ (Ω·cm), and the upper limit value of the volume resistivity is not particularly limited. When the volume resistivity exceeds $5.0 \times 10^{15}$ (Ω·cm), the insulation resistance is improved when water is absorbed in the insulating layer 22, which is preferable from the viewpoint of direct current stability. Incidentally, herein, the volume resistivity is evaluated in compliance with JIS C 2151.

As the resin component forming the insulating layer 22, a resin having a melting point of 125 degrees C. or higher is used. Such a resin includes a polyethylene, among others a polyethylene having a density of 0.930 g/m³ or more is suitable. As such a polyethylene, a low density polyethylene (LDPE), a high density polyethylene (HDPE) or the like can be used.

Further, the insulating layer 22 is made of a resin composition including a resin component, and the resin component includes 40% by mass or more of a resin having a melting point of 125 degrees C. or higher, of 100% by mass of the resin component. When the resin component includes 40% by mass or more of a resin having a melting point of 125 degrees C. or higher, the oil resistance can be provided. The upper limit of the content of the resin having a melting point of 125 degrees C. or higher is not particularly limited, but in the case of using the polyethylene, since the polyethylene having a high melting point has a large amount of crystal and is hard, it tends to lower the flexibility of the electric wire itself. For this reason, it is desirable that the content of the resin having a melting point of 125 degrees C. or higher is 70% by mass or less in the electric wire required to have flexibility.

In addition, the resin component may include a resin other than the resin having a melting point of 125 degrees C. or higher. E.g., it is possible to use a polyimide, a polyether ether ketone (PEEK), a polyamide imide (PAI), a linear low density polyethylene (LLDPE), an ethylene-α olefin copolymer, an ethylene-vinyl acetate copolymer (EVA), an ethylene-ethyl acrylate copolymer, an ethylene-methyl acrylate copolymer, an ethylene-glycidyl methacrylate copolymer, an ethylene-acrylic acid ester copolymer, an ethylene-propylene-diene copolymer or the like. One kind of these resins may be used alone, or two or more kinds of them may be used in combination.

From the viewpoint of further improving the water-blocking properties of the insulating layer 22, it is preferable to compound a crosslinking agent, a crosslinking aid or the like into the insulating resin composition and crosslink the insulating resin composition to form the insulating layer 22 of a crosslinked body. By crosslinking, the molecular structure of the resin can be strengthened, and the water blocking properties of the insulating layer 22 can be improved. Moreover, since the strength of the insulating layer 22 can also be improved, even if the thickness of the insulating layer 22 is made thin, the water shielding properties can be kept high without impairing the strength. The insulating layer 22 is preferably a non-halogen resin composition.

The crosslinked body forming the insulating layer 22 is preferably crosslinked so that the gel fraction is 40% or more and 100% or less. Since the insulation layer 22 can increase its strength and water blocking properties by increasing the gel fraction of the crosslinked body, it is possible to reduce its thickness.

In the case of crosslinking the insulating layer 22, a known crosslinking agent or a known crosslinking aid may be added to the insulating resin composition. As the crosslinking agent, e.g., an organic peroxide, a silane coupling agent or the like can be used. As the crosslinking aid, e.g., a polyfunctional monomer such as triallyl isocyanurate and trimethylol propane acrylate can be used. The compounding amounts of these are not particularly limited, but they may be appropriately changed, e.g., so that the degree of crosslinking of the crosslinked body forming the insulating layer 22 is 40% or more and 100% or less in gel fraction. Incidentally, the crosslinking method can be carried out by a known method such as chemical crosslinking or electron beam crosslinking depending on the type of the crosslinking agent.

In addition, the resin composition forming the insulating layer 22 preferably includes at least one of an antioxidant and a copper inhibitor, and more preferably includes both an antioxidant and a copper inhibitor.

In addition, the insulating layer 22 may include the additive in an amount of 5 parts by mass or less with respect to 100 parts by mass of the resin component. Preferably, the additive is included in an amount of 3 parts by mass or less, more preferably the additive is included in an amount of 1.5 parts by mass or less.

Here, the additive means an additive such as a crosslinking agent, a crosslinking aid, a copper inhibitor, a flame retardant, a flame retardant aid, a plasticizer, a metal chelating agent, a filler, a softening agent, a reinforcing agent, a surfactant, a stabilizer, an ultraviolet absorber, a light stabilizer, a lubricant, an antioxidant, a colorant (such as carbon black), a processability improver, an inorganic filler, a compatibilizer, a foaming agent, an antistatic agent or the like.

(Second Flame Retardant Layer)

The second flame retardant layer 24 is formed, e.g., by extruding a flame retardant resin composition including a flame retardant around the outer circumference of the insulating layer 22, and similarly to the first flame retardant layer 20, it is preferable that the oxygen index exceeds 45. Since the second flame retardant layer 24 is located at the outermost layer and is not covered with the insulating layer 22 like the first flame retardant layer 20, water easily permeates thereinto and the second flame retardant layer 24 does not contribute to the direct current stability, but covers the insulation layer 22 with poor flame retardancy, and suppresses deterioration of the flame retardancy of the entire covering layer. The second flame retardant layer 24 is preferably composed of a non-halogen flame retardant resin composition.

Incidentally, the same flame retardant resin composition as the first flame retardant layer 20 can be used as the flame retardant resin composition for forming the second flame retardant layer 24. Further, the second flame retardant layer 24 may be crosslinked in the same manner as the first flame retardant layer 20. The crosslinking of the second flame retardant layer 24 may be carried out, e.g., by compounding a crosslinking agent and a crosslinking aid in the resin composition forming the second flame retardant layer 24, extrusion molding and then crosslinking. The crosslinking method is not particularly limited, but can be carried out by a conventionally known method such as irradiation with an electron beam.

(Stacked Structure of Covering Layer)

Subsequently, the stacked structure of the covering layer (the first flame retardant layer, the insulating layer, the second flame retardant layer) will be described. In the covering layer, the thickness of the insulating layer 22 is not particularly limited, but is preferably 0.05 mm or more from the viewpoint of water shielding properties. By setting it at 0.05 mm or more, the strength of the insulating layer 22 can be increased, and the breakage of the insulating layer 22 at the time of bending the insulated electric wire 1 can be suppressed. Thereby, the water blocking properties of the insulating layer 22 is further improved, and the first flame retardant layer 20 can further contribute to the direct current stability. On the other hand, although the upper limit value of the thickness of the insulating layer 22 is not particularly limited, it is preferably 0.10 mm or less from the viewpoint of flame retardancy of the insulated electric wire 1. Since the insulating layer 22 includes substantially no flame retardant, there is a fear that the flame retardancy of the insulated electric wire 1 may be lowered, but by setting the thickness of the insulating layer 22 to 0.10 mm or less, it is possible to further improve the flame retardancy of the insulated electric wire 1 and maintain the high flame retardancy.

Further, in the covering layer, the thickness of each of the first flame retardant layer 20 and the second flame retardant layer 24 is not particularly limited, but may be suitably changed according to the flame retardancy and the direct current stability required for the covering layer, and, from the viewpoint of obtaining the higher flame retardancy, the total thickness of the first flame retardant layer 20 and the second flame retardant layer 24 is preferably 0.35 mm or more.

Since the first flame retardant layer 20 contributes to the flame retardancy and the direct current stability of the covering layer, from the viewpoint of obtaining the desired direct current stability, it is preferable that the thickness of the first flame retardant layer 20 be at least 0.5 times the strand diameter of the metal wire constituting the conductor 11, e.g., 0.10 mm or more when the strand diameter is 0.20 mm or less. When the thickness of the first flame retardant layer 20 is excessively thin, when the conductor 11 is formed by stranding a plurality of metal wires, the surface irregularities of the conductor 11 caused by the metal wire cannot be sufficiently absorbed, and the surface of the insulating layer 22 provided over the first flame retardant layer 20 may be uneven. Therefore, by setting the thickness of the first flame retardant layer 20 within the above range, the first flame retardant layer 20 can be formed flat so that the surface irregularities of the insulating layer 22 can be reduced. On the other hand, the upper limit value is not particularly limited, but can be appropriately changed in consideration of the flame retardancy of the covering layer and the reduction in diameter of the insulated electric wire 1.

Since the second flame retardant layer 24 covers the insulating layer 22 and suppresses the burning thereof, it is preferable that its thickness be at least 0.25 mm or more. On the other hand, the upper limit value is not particularly limited, but can be appropriately changed in consideration of the flame retardancy of the covering layer and the reduction in diameter of the insulated electric wire 1.

The covering layer according to the embodiment of the present invention shown in FIG. 1 is composed of three layers, but a plurality of the first flame retardant layers 20 may be provided around the outer circumference of the conductor 11, and a plurality of the insulating layers 22 may have around the outer circumference of the first flame retardant layer 20, and the covering layer may be a multi-layer structure in which a plurality of the second flame retardant layers 24 are provided around the outer circumference of the insulating layer 22.

In addition, the first flame retardant layer 20 may be around the outer circumference of the conductor 11, the second flame retardant layer 24 may be at the outermost layer, and the insulating layer 22 may be between the first flame retardant layer 20 and the second flame retardant layer 24, and another layer of a resin composition may be present between the first flame retardant layer 20 and the insulating layer 22, and between the insulating layer 22 and the second flame retardant layer 24.

Figure 2:
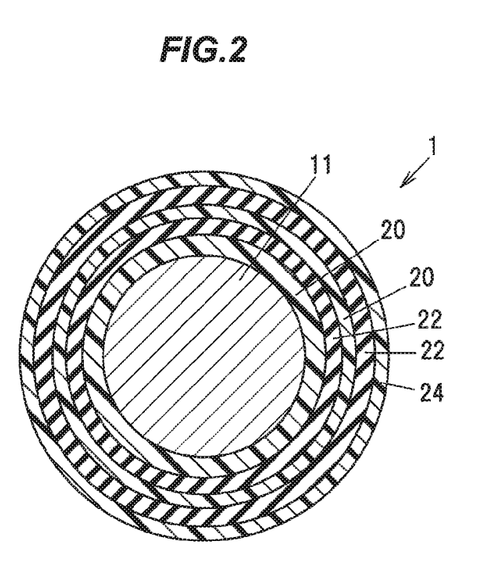
FIG. 2 is a transverse sectional view of an insulated electric wire in another embodiment according to the present invention.

Further, as shown in FIG. 2, a five layer structure may be formed by interposing the insulating layers 22 between the three layers of the flame retardant layers (the first flame retardant layer 20, the first flame retardant layer 20, and the second flame retardant layer 24) respectively, so a plurality of the first flame retardant layers 20 and a plurality of the insulating layers 22 may be provided.

The "thickness of the covering layer" as used herein means the thickness of the entire covering layer including an insulating layer, if present, other than the first flame retardant layer 20, the insulating layer 22 and the second flame retardant layer 24.

Incidentally, the insulated electric wire of the present embodiment is not particularly limited in applications, but it is used as, e.g., a power system wire (insulated electric wire in compliance with Power & Control Cables described in EN50264-3-1 (2008)).

EXAMPLES

Next, the present invention will be described in more detail based on examples, but the present invention is not limited to these examples.

<Materials Used in Examples and Comparative Examples>
Ethylene-vinyl acetate copolymer (EVA 1):
"Evaflex V 5274" (VA amount: 17%, MFR: 0.8) available from Du Pont-Mitsui Polychemicals Co., Ltd.
Ethylene-vinyl acetate copolymer (EVA 2):
"Evaflex EV 260" (VA amount: 28%, MFR: 6) available from Du Pont-Mitsui Polychemicals Co., Ltd.
Ethylene-vinyl acetate copolymer (EVA 3):
"Evaflex EV 170" (VA amount: 33%, MFR: 1) available from Du Pont-Mitsui Polychemicals Co., Ltd.
Ethylene-vinyl acetate copolymer (EVA 4):
"Evaflex EV 45 X" (VA amount: 46%, MFR: 100) available from Du Pont-Mitsui Polychemicals Co., Ltd.
High density polyethylene (HDPE, d: 0.951 g/cm$^3$, MFR: 0.8, mp: 130 degrees C.): "HI-ZEX 5305E" available from Prime Polymer Co., Ltd.
Low density polyethylene (LDPE, d: 0.921 g/cm$^3$, MFR: 1, mp: 112 degrees C.): "UBE C450" available from Ube Industries, Ltd.
Linear low density polyethylene (LLDPE 1),
"SP 2030" (d: 0.922 g/cm$^3$, MFR: 2.5, mp: 122 degrees C.) available from Prime Polymer Co., Ltd.
Linear low density polyethylene (LLDPE 2), "SP 4030" (d: 0.938 g/cm$^3$, MFR: 3.8, mp: 127 degrees C.) available from Prime Polymer Co., Ltd.
Linear low density polyethylene (LLDPE 3),
"SP 1510" (d: 0.915 g/cm$^3$, MFR: 1.0, mp=118 degrees C.) available from Prime Polymer Co., Ltd.
Maleic acid modified polymer: "TAFMER MH 7020" available from Mitsui Chemicals, Inc.
Silane-treated magnesium hydroxide: "H10A" available from HUBER Co., Ltd.
Fatty acid treated magnesium hydroxide: "H10C" available from HUBER
Aluminum hydroxide treated with fatty acid: "OL 107 C" available from HUBER Co., Ltd.
Mixed antioxidant: "AO-18" available from ADEKA CORPORATION
Phenol type antioxidant: "IRGANOX 1010" available from BASF Corporation
Copper inhibitor: "Irganox MD 1024" available from BASF Ltd.
Coloring agent (carbon black): "FT carbon" available from Asahi Carbon Co., Ltd.
Lubricant (zinc stearate): available from Nitto Kasei Co., Ltd.

<Preparation of Flame Retardant Resin Composition>

To prepare flame retardant resin compositions, various components were compounded at the composition compounding ratios shown in Table 1, kneaded under conditions of a starting temperature of 40 degrees C. and an end temperature of 190 degrees C. by a pressure kneader, and then extruded using an extruder to form strands, which were water cooled and cut to produce pelletized flame retardant resin compositions. These pellets were cylindrical in shape with a diameter of about 3 mm and a height of about 5 mm

TABLE 1

(In Table, compounding unit is part by mass.)

| | | | Flame retardant resin composition | | | | | | |
|---|---|---|---|---|---|---|---|---|---|
| | | | Flame retardant 1 | Flame retardant 2 | Flame retardant 3 | Flame retardant 4 | Flame retardant 5 | Flame retardant 6 | Flame retardant 7 |
| Composition | Resin component | EVA1 (VA amount 17%, MFR = 0.8) | | | 70 | | | | |
| | | EVA2 (VA amount 28%, MFR = 6) | 85 | | | 70 | 70 | 70 | |
| | | EVA3 (VA amount 33%, MFR = 1) | | 70 | | | | | 40 |
| | | LDPE | | | | | | | 30 |
| | | EVA4 (VA amount 46%, MFR = 100) | | 15 | | | | | 15 |
| | | Maleic acid modified polymer | 15 | 15 | | | | | 15 |
| | Flame retardant | Silane-treated magnesium hydroxide | 80 | 80 | 40 | 60 | 100 | 80 | 80 |
| | | Fatty acid treated magnesium hydroxide | 120 | 120 | 60 | 90 | 150 | | 120 |
| | | Fatty acid treated aluminum hydroxide | | | | | | 120 | |
| | Antioxidant | Mixed antioxidant | 1 | 1 | 1 | 1 | 1 | 1 | 1 |
| | Coloring agent | Carbon black (FT carbon) | 2 | 2 | 2 | 2 | 2 | 2 | 2 |
| | Lubricant | Zinc stearate | 1 | 1 | 1 | 1 | 1 | 1 | 1 |
| | | Total | 304 | 304 | 104 | 224 | 324 | 274 | 304 |
| | | Volume resistivity ($\Omega \cdot$ cm) | $4.0 \times 10^{14}$ | $2.3 \times 10^{14}$ | $9.2 \times 10^{14}$ | $5.8 \times 10^{14}$ | $1.1 \times 10^{14}$ | $1.0 \times 10^{14}$ | $3.0 \times 10^{14}$ |

<Preparation of Insulating Resin Composition>

To prepare insulating resin compositions, various components were compounded at the composition compounding ratios shown in Table 2, kneaded under conditions of a starting temperature of 40 degrees C. and an ending temperature of 190 degrees C. by a pressure kneader and then extruded using an extruder to form strands, which were cooled with water and cut to produce pelletized insulating resin compositions. These pellets were cylindrical in shape with a diameter of about 3 mm and a height of about 5 mm

TABLE 2

(In Table, compounding unit is part by mass.)

| | | | | Insulation resin composition | | | | | |
|---|---|---|---|---|---|---|---|---|---|
| | | | | Insulation 1 | Insulation 2 | Insulation 3 | Insulation 4 | Insulation 5 | Insulation 6 |
| Composition | Resin component | HDPE | Hi-ZEX 5305E (d = 0.951, mp = 130° C.) | 70 | | | 30 | | |
| | | LLDPE2 | SP4030 (d = 0.938, mp = 127° C.) | | 70 | 40 | 30 | | 30 |
| | | LLDPE1 | SP2030 (d = 0.922, mp = 122° C.) | 30 | | 60 | | 100 | 70 |
| | | LLDPE3 | SP1510 (d = 0.915, mp = 118° C.) | | 30 | | 40 | | |
| | Antioxidant | Phenoltype antioxidant | Irganox 1010 | 1 | 1 | 1 | 1 | 1 | 1 |
| | Copper inhibitor | | Irganox MD1024 | 0.5 | 0.5 | 0.5 | 0.5 | 0.5 | 0.5 |
| | | Total | | 101.5 | 101.5 | 101.5 | 101.5 | 101.5 | 101.5 |
| | | Volume resistivity ($\Omega \cdot$ cm) | | $1.2 \times 10^{17}$ | $1.8 \times 10^{17}$ | $9.9 \times 10^{18}$ | $1.2 \times 10^{17}$ | $1.1 \times 10^{17}$ | $1.2 \times 10^{17}$ |

<Production of Insulated Wire>

Example 1

An insulated electric wire 1 was produced using the above-mentioned flame retardant resin composition and insulating resin composition. Specifically, three layers of the flame retardant resin composition ("Flame retardant 1" in Table 1), the insulating resin composition ("Insulation 1" in Table 2) and the flame retardant resin composition ("Flame retardant 1" in Table 1) were extruded at the same time at each predetermined thickness around the outer periphery of a tin-plated copper conductor wire having an outer diameter of 1.25 mm and irradiated with an electron beam so that the absorbed dose was 75 kGy, to crosslink each component. This produced an insulated electric wire 1 of Example 1. In the produced insulated electric wire 1, in turn from the conductor side, the thickness of the first flame retardant layer was 0.29 mm, the thickness of the insulating layer was 0.11 mm, the thickness of the second flame retardant layer was 0.10 mm, and the thickness of the covering layer was 0.50 mm. Also, the three-layer simultaneous extrusion was carried out by using three short-axis extruders and joining them in the crosshead.

The produced insulated electric wire 1 was evaluated for mechanical strength, direct current stability and flame retardancy by the following method.

<Properties Evaluation>

(Direct Current Stability)

The direct current stability was evaluated by the direct current test in compliance with EN50305.6.7. Specifically, the insulated electric wire 1 was immersed in a 3% NaCl aqueous solution at 85 degrees C. and impressed at 1500 V. In the case where no dielectric breakdown occurred even after 240 hours or more, it was evaluated as electrically excellent, accepted (○), or if dielectric breakdown occurred in less than 240 hours, it was evaluated as rejected (X).

(Flame Retardancy)
(VFT)

A vertical flame test (VFT) was performed as a flame retardancy test in compliance with EN60332-1-2. An insulated electric wire having a length of 600 mm was held vertically and a flame was applied to the insulated electric wire for 60 seconds. After removing the flame, those which were extinguished within 60 seconds were determined as accepted (○), or those which were not extinguished within 60 seconds were determined as rejected (X).

(VTFT)

A vertical tray flame test (VTFT) in compliance with EN50266-2-4 was carried out. Specifically, 7 electric wires with a total length of 3.5 m were bundled into 1 bundle, and 11 bundles were evenly and vertically spaced, burned for 20 minutes, and then after self-extinguishing, was targeted a carbonization length of 2.5 m or less from the lower end. If the carbonization length was 1.5 m or less, it was determined as accepted (◎), or if the carbonization length was more than 1.5 m and not more than 2.5 m, it was determined as accepted (○), or if it exceeded 2.5 m, it was determined as rejected (X).

(Oil Resistance)

An oil resistance test in compliance with EN60811-2-1 was carried out. Specifically, after immersing a test sample in IRM 902 oil at 100 degrees C. for 72 hours, it was taken out and the sample left at room temperature was subjected to a tensile test to measure the rate of change with the initial product. Those having a tensile strength change rate of ±30% or less and an elongation change rate of ±40% or less were determined as accepted (○), or those having a rate of change higher than that were determined as rejected (X).

(Diameter Reduction)

Compared with the data of Conductor diameter and Mean thickness of insulation described in Table 1-General data-Cable type 0, 6/1 kV unsheathed of EN50264-3-1 (2008), the case where the value of the thickness of the covering layer relative to the outer diameter of the conductor was large was determined as rejected (X) or the case where the value of the thickness of the covering layer relative to the outer diameter of the conductor was small was determined as accepted (○).

Incidentally, the thickness of each of the first flame retardant layer, the insulating layer, and the second flame retardant layer was an average value produced by dividing a 1 m sample into 10 equal parts, observing and measuring a cut surface with a macro scope.

Examples 2 to 13

In Examples 2 to 13, the insulated electric wire 1 was produced in the same manner as in Example 1, except that the combination of the flame retardant resin composition and the insulating resin composition of the first flame retardant layer, the insulating layer and the second flame retardant layer was changed, and that the thicknesses of the first flame retardant layer, the insulating layer and the second flame retardant layer were changed.

The results of Examples 1 to 13 described above were shown together in Tables 3 and 4.

TABLE 3

| | | Example 1 | Example 2 | Example 3 | Example 4 | Example 5 | Example 6 | Example 7 | Example 8 | Example 9 |
|---|---|---|---|---|---|---|---|---|---|---|
| Second flame retardant layer | Flame retardant resin composition | Flame retardant 1 | Flame retardant 2 | Flame retardant 3 | Flame retardant 4 | Flame retardant 5 | Flame retardant 6 | Flame retardant 7 | Flame retardant 1 | Flame retardant 1 |
| Second flame retardant layer thickness | (mm) | 0.29 | 0.29 | 0.29 | 0.29 | 0.29 | 0.29 | 0.29 | 0.29 | 0.29 |
| Insulating layer | Insulation resin composition | Insulation 1 | Insulation 1 | Insulation 1 | Insulation 1 | Insulation 1 | Insulation 1 | Insulation 1 | Insulation 2 | Insulation 3 |
| Insulating layer thickness | (mm) | 0.11 | 0.11 | 0.11 | 0.11 | 0.11 | 0.11 | 0.11 | 0.11 | 0.11 |

TABLE 3-continued

|  |  | Example 1 | Example 2 | Example 3 | Example 4 | Example 5 | Example 6 | Example 7 | Example 8 | Example 9 |
|---|---|---|---|---|---|---|---|---|---|---|
| First flame retardant layer | Flame retardant resin composition | Flame retardant 1 | Flame retardant 2 | Flame retardant 3 | Flame retardant 4 | Flame retardant 5 | Flame retardant 6 | Flame retardant 7 | Flame retardant 1 | Flame retardant 1 |
| First flame retardant layer | (mm) | 0.10 | 0.10 | 0.10 | 0.10 | 0.10 | 0.10 | 0.10 | 0.10 | 0.10 |
| Covering layer thickness | (mm) | 0.50 | 0.50 | 0.50 | 0.50 | 0.50 | 0.50 | 0.50 | 0.50 | 0.50 |
| Properties evaluation results | DC stability | ○ | ○ | ○ | ○ | ○ | ○ | ○ | ○ | ○ |
|  | Flame retardant (VFT) | ○ | ○ | ○ | ○ | ◎ | ○ | ○ | ○ | ○ |
|  | Flame retardant (VTFT) | ○ | ○ | ○ | ○ | ◎ | ○ | ○ | ○ | ○ |
|  | Oil resistance | ○ | ○ | ○ | ○ | ○ | ○ | ○ | ○ | ○ |
|  | Diameter reduction | ○ | ○ | ○ | ○ | ○ | ○ | ○ | ○ | ○ |

TABLE 4

|  |  | Example 10 | Example 11 | Example 12 | Example 13 | Comparative example 1 | Comparative example 2 | Comparative example 3 | Comparative example 4 |
|---|---|---|---|---|---|---|---|---|---|
| Second flame retardant layer | Flame retardant resin composition | Flame retardant 1 | Flame retardant 1 | Flame retardant 1 | Flame retardant 1 | — | Flame retardant 1 | Flame retardant 1 | Flame retardant 1 |
| Second flame retardant layer thickness | (mm) | 0.29 | 0.29 | 0.30 | 0.29 | — | 0.40 | 0.29 | 0.29 |
| Insulating layer | Insulation resin composition | Insulation 4 | Insulation 1 | Insulation 1 | Insulation 1 | Insulation 1 | — | Insulation 5 | Insulation 6 |
| Insulating layer thickness | (mm) | 0.11 | 0.11 | 0.15 | 0.08 | 0.11 | — | 0.11 | 0.11 |
| First flame retardant layer | Flame retardant resin composition | Flame retardant 1 | Flame retardant 1 | Flame retardant 1 | Flame retardant 1 | Flame retardant 1 | Flame retardant 1 | Flame retardant 1 | Flame retardant 1 |
| First flame retardant layer | (mm) | 0.10 | 0.10 | 0.05 | 0.10 | 0.40 | 0.10 | 0.10 | 0.10 |
| Covering layer thickness | (mm) | 0.50 | 0.50 | 0.50 | 0.47 | 0.51 | 0.50 | 0.50 | 0.50 |
| Properties evaluation results | DC stability | ○ | ○ | ○ | ○ | ○ | X | ○ | ○ |
|  | Flame retardancy (VFT) | ○ | ○ | ○ | ○ | X | ○ | ○ | ○ |
|  | Flame retardancy (VTFT) | ○ | ○ | ○ | ○ | X | ○ | ○ | ○ |
|  | Oil resistance | ○ | ○ | ○ | ○ | ○ | ○ | X | X |
|  | Diameter reduction | ○ | ○ | ○ | ○ | ○ | ○ | ○ | ○ |

Examples 1 to 13

In Examples 1 to 13, the direct current stability, the flame retardancy and the oil resistance were accepted (◎ or ○).

Also, in the Examples, the outer diameters of the conductors were 1.25 mm and the thicknesses of the covering layers were 0.47 mm to 0.50 mm, whereas in Table 1 of the above EN50264-3-1, the outer diameters of the conductors were 1.25 mm and the thicknesses of the covering layers were 0.6 mm From this, comparing the thicknesses of the covering layers of both, in the examples, the values of the thicknesses of the covering layers relative to the outer diameters of the conductors were smaller, so were accepted (○) from the viewpoint of reducing the diameter.

Comparative Example 1

In Comparative Example 1, the insulated electric wire 1 was produced in the same manner as in Example 1, except that no second flame retardant layer was used and that the thicknesses of the first flame retardant layer and the insulating layer were changed. Since no second flame retardant layer was formed, the flame retardancy was rejected.

Comparative Example 2

In Comparative Example 2, the insulated electric wire 1 was produced in the same manner as in Example 1, except that no insulating layer was used and that the thicknesses of the first flame retardant layer and the second flame retardant layer were changed. Since the covering layer was formed of only the flame retardant layer without provision of the insulating layer, the flame retardancy was accepted but the direct current stability was rejected.

Comparative Example 3 and Comparative Example 4

In Comparative Example 3 and Comparative Example 4, the insulated electric wire 1 was produced in the same manner as in Example 1 except that the combination of the insulating resin compositions of the insulating layer was changed. Since the resin component of the resin composition forming the insulating layer did not include 40% by mass or more of the resin having a melting point of 125 degrees C. or higher, of 100% by mass of the resin component, the oil resistance was rejected.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An insulated electric wire, comprising:
a conductor; and
a covering layer disposed around an outer circumference of the conductor,
wherein the covering comprises a first flame retardant layer composed of a flame retardant resin composition including a first resin component and a first flame retardant and a second flame retardant layer composed of a flame retardant resin composition including a second resin component and a second flame retardant, and an insulating layer interposed between the first flame retardant layer and the second flame retardant layer,
wherein the insulating layer comprises a resin composition including a third resin component, and the third resin component includes 40% by mass or more of a resin having a melting point of 125 degrees C. or higher of 100% by mass of the third resin component, and
wherein each of the flame retardant resin compositions for forming the first and second flame retardant layers includes 150 parts by mass or more and 250 parts by mass or less of flame retardant with respect to 100 parts by mass of resin component, and
wherein the insulating layer is absent a flame retardant.

2. The insulated electric wire according to claim 1, wherein the resin having a melting point of 125 degrees C. or higher is polyethylene having a density of 0.930 g/m$^3$ or more.

3. The insulated electric wire according to claim 1, wherein the insulated electric wire has a flame retardancy which passes the vertical flame test (VFT), based on EN60332-1-2 published in 2016.

4. The insulated electric wire according to claim 1, wherein the insulated electric wire has a direct current stability which passes the direct current stability test in compliance with EN50305.6.6.7 published in 2002.

5. The insulated electric wire according to claim 1, wherein a diameter of the conductor is 1.25 mm or less and a thickness of the covering layer is less than 0.6 mm.

6. The insulated electric wire according to claim 1, wherein the insulating layer has a volume resistivity defined by JIS C 2151 published in 2006 exceeding $5.0 \times 10^{15}$ ($\Omega 2 \cdot cm$).

7. The insulated electric wire according to claim 1, wherein the insulating layer includes the third resin component and an additive, and includes 5 parts by mass or less of the additive with respect to 100 parts by mass of the third resin component.

8. The insulated electric wire according to claim 1, wherein the insulating layer includes the third resin component and an additive, and includes 3 parts by mass or less of the additive with respect to 100 parts by mass of the third resin component.

9. The insulated electric wire according to claim 1, wherein the insulating layer includes the third resin component and an additive, and includes 1.5 parts by mass or less of the additive with respect to 100 parts by mass of the third resin component.

10. The insulated electric wire according to claim 1, wherein the flame retardant resin composition for forming the first flame retardant layer and the flame retardant resin composition for forming the second flame retardant layer are made of the same material.

11. The insulated electric wire according to claim 1, wherein the flame retardant resin composition for forming the first flame retardant layer comprises a non-halogen flame retardant resin composition.

12. The insulated electric wire according to claim 1, wherein the flame retardant resin composition for forming the second flame retardant layer comprises a non-halogen flame retardant resin composition.

13. The insulated electric wire according to claim 1, wherein the flame retardant resin composition for forming the first flame retardant layer and the flame retardant resin composition for forming the second flame retardant layer comprise a non-halogen flame retardant resin composition.

14. The insulated electric wire according to claim 1, wherein the second flame retardant layer comprises an extruded flame retardant resin composition including a flame retardant around the outer circumference of the insulating layer.

15. The insulated electric wire according to claim 1,
wherein the second flame retardant layer comprises an extruded flame retardant resin composition including a flame retardant around the outer circumference of the insulating layer, and
wherein an oxygen index of the second flame retardant layer exceeds 45.

16. The insulated electric wire according to claim 1, wherein the second flame retardant layer does not contribute to a direct current stability of the insulated electric wire.

17. The insulated electric wire according to claim 1,
wherein the first flame retardant layer is crosslinked, and
wherein the second flame retardant layer is crosslinked.

* * * * *